June 17, 1947. H. S. ALEXANDER 2,422,384
STEREOSCOPICAL INSTRUMENT
Filed April 3, 1945 4 Sheets-Sheet 1

INVENTOR.
Harry S. Alexander
BY
Ivan E. A. Koenigsberg

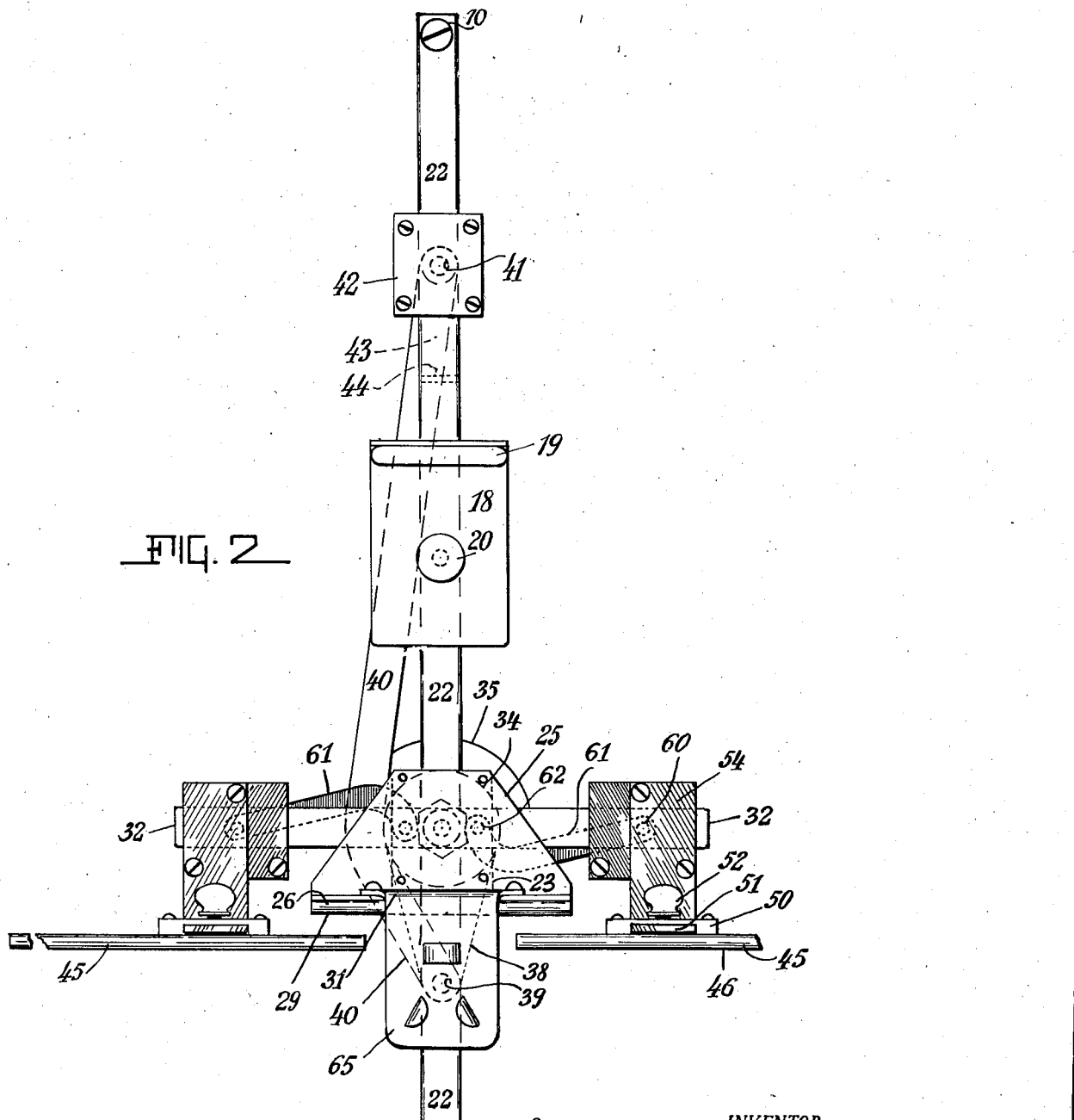

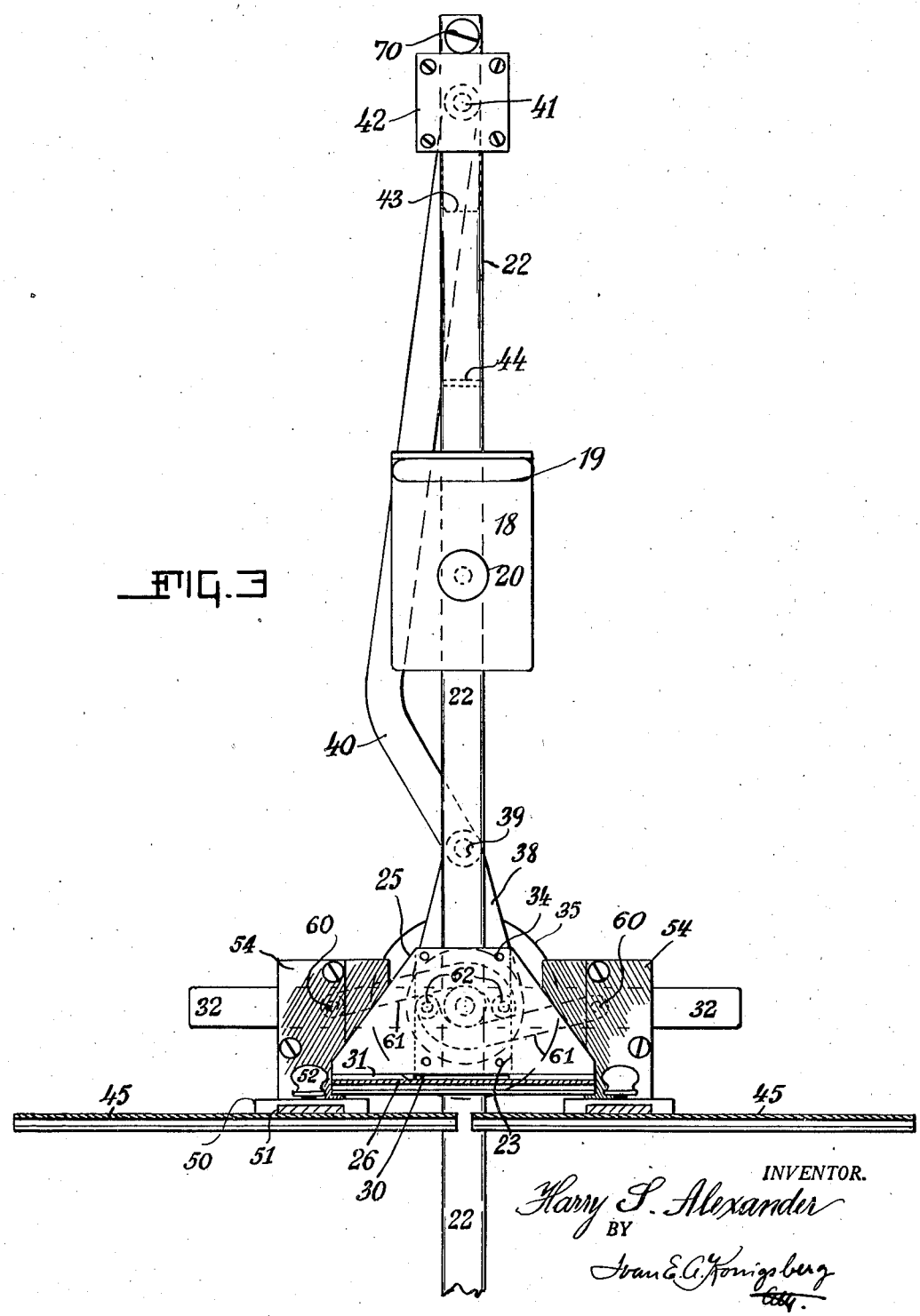

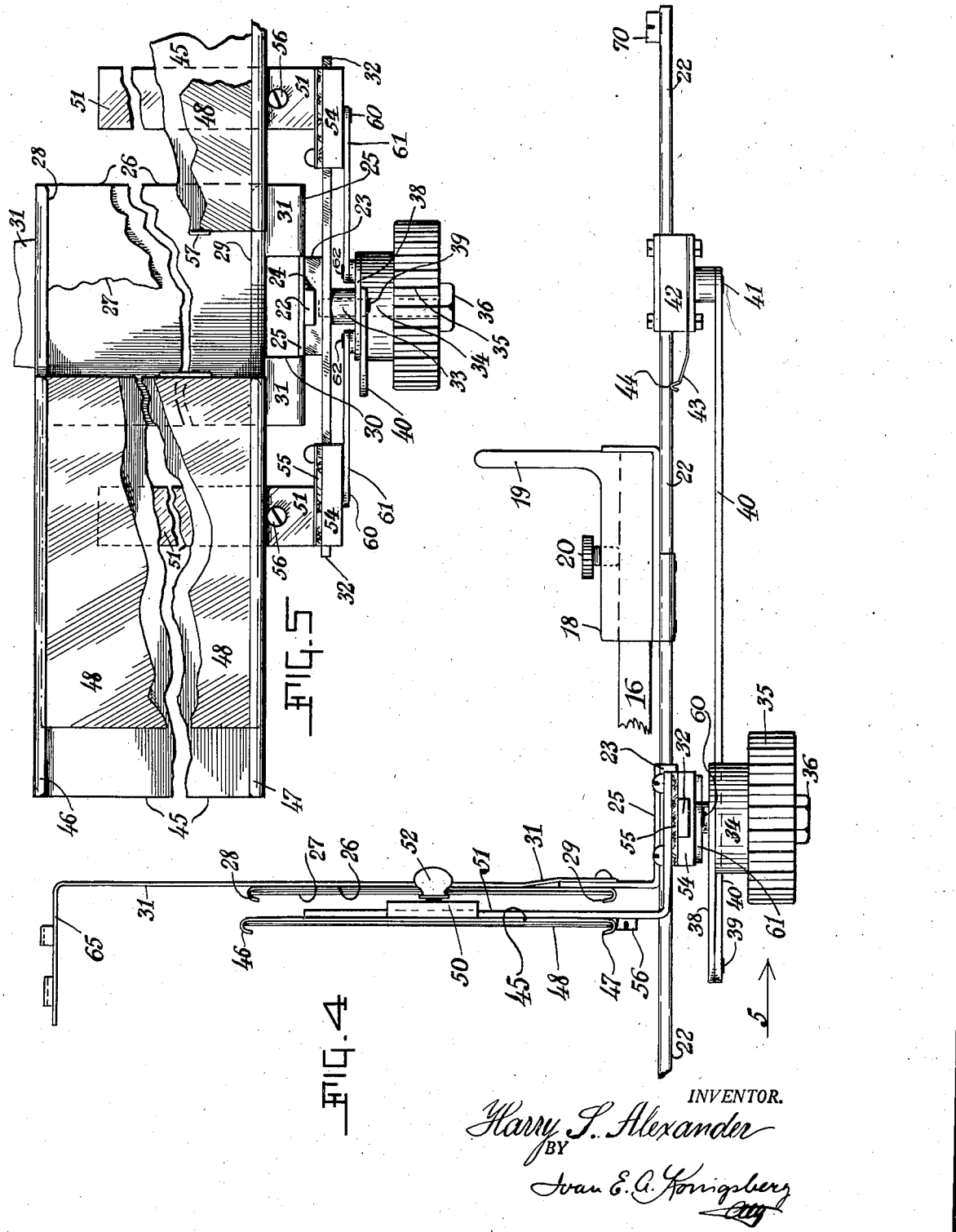

Patented June 17, 1947

2,422,384

UNITED STATES PATENT OFFICE 2,422,384

STEREOSCOPICAL INSTRUMENT

Harry S. Alexander, Meadville, Pa., assignor to Keystone View Company, Meadville, Pa., a corporation of Pennsylvania Application April 3, 1945, Serial No. 586,294

3 Claims. (Cl. 128—76.5)

This invention relates to improvements in stereoscopic instruments of the type which are used for testing eye coordination, for detecting binocular anomalies, for basic orthoptic training and for the training of binocular vision. The general construction, use and function of such instruments are known to the art. Usually the instrument comprises a stand which carries a pair of binoculars, that is, a pair of viewing cylinders with appropriate lenses. From the binoculars extends a central shaft along the line of sight and the shaft forms the support for a slide holder unit which is adapted to be moved along the shaft. The unit carries a pair of split targets or slides, that is, pictures, diagrams or the like, one slide being the stereoscopic complement of the other slide. The slide holders may be moved on the shaft along the line of sight from a near view position to a far view position and vice versa. The pair of split slide holders may be moved transversely with respect to one another. By moving the slide holder unit lengthwise upon the central shaft towards and away from the viewer and at the same time changing the spacing between the split slides, changes in eye accommodation and convergence may be practised. The longitudinal movement of the unit may be executed without changing the spacing between the slides in which case only the eye accommodation is changed. If the spacing between the slides is changed without any longitudinal movement of the unit, only changes in eye convergence result. Other eye exercises may of course be practised with this type of stereoscopic instrument.

The object of this invention is to provide a novel and generally improved split slide holder mechanism with which all of the movements or operations necessary for prescribed eye exercises may be done in a convenient, simple manner, severally or in combination. The invention is embodied in an attachment adapted to be mounted upon the central shaft of a standard stereoscopic instrument of the type referred to.

With this and other ancillary objects in view, the invention is embodied in an attachment for a stereoscopic instrument arranged and constructed as hereinafter described and as illustrated in the accompanying drawings in which Fig. 1 is a side view of the stereoscopic instrument equipped with an attachment embodying the invention.

Fig. 2 is a plan view of the attachment, parts being broken away. The picture slides or target holders are shown in the position in which they are spaced farthest apart.

Fig. 3 is a plan view showing the slide holders in the position in which they are closest together, parts are in section and parts are broken away.

Fig. 4 is a side view of the attachment looking from the right in Figure 2.

Fig. 5 is a front view looking in the direction of the arrow 5 in Figure 4 and with parts broken away.

Figure 1:
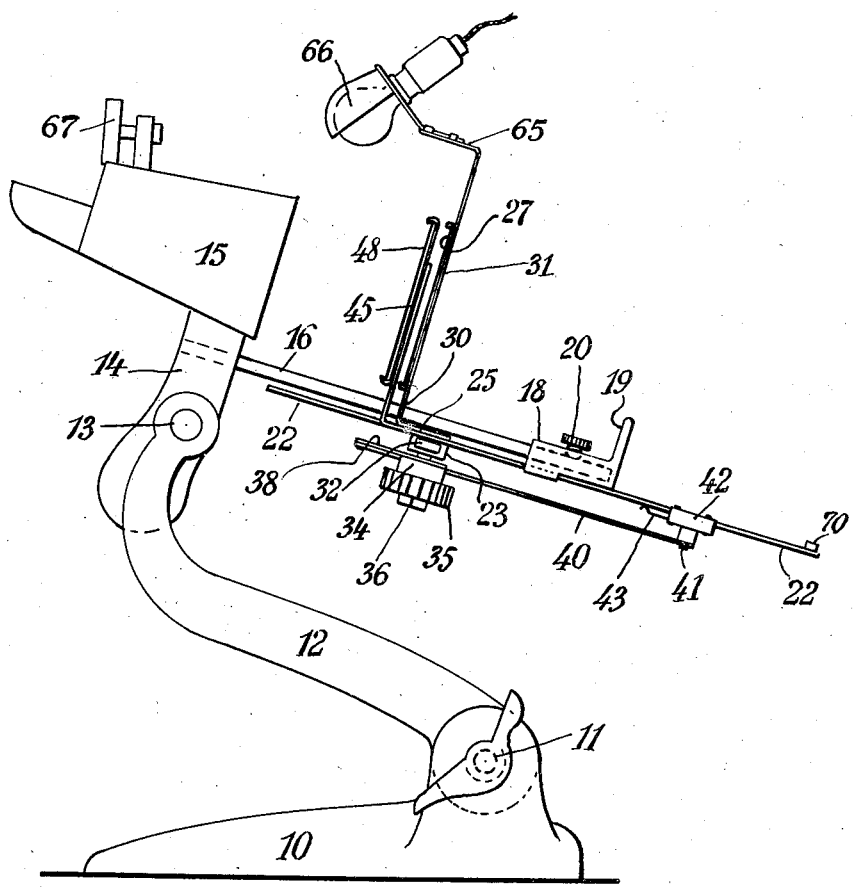

Referring first to Figure 1, the standard stereoscopic instrument is shown in conventional outline and comprises a base 10 upon which is pivoted at 11 an arm 12. To the latter there is pivoted at 13 a binocular support 14 which carries a pair of binoculars 15. The pivoted connections provide for angular adjustments. A central shaft 16 is secured to the support 14 in any convenient and usual manner. The central shaft is calibrated in accordance with accepted standards in this art. The calibrations are not shown. This brief description and the outline illustration are sufficient for an understanding of the invention.

The split slide holder embodying the invention comprises a central hollow main bearing 18 having a finger grip 19 and adapted to be secured upon the end of the central shaft 16 by means of a set screw 20. The finger grip serves as a convenient means for handling the attachment. The bearing 18 has secured thereto a bar 22 which extends longitudinally of the attachment and the instrument and which serves as a central shaft. The split slide holder unit is mounted to slide upon the bar 22. The unit, Fig. 5, comprises a central bearing member 23 which is grooved as at 24 to receive the bar 22 in slidable relation. The groove is closed on the top by a plate 25. The plate is bent vertically to form an upright support 31 for a background card holder 26. A background card 27 is placed in the holder between upper and lower bent over flanges 28 and 29. The support 31 is cut out as at 30 to form a rectangular opening through which passes the central shaft 16.

The bearing 23 has fixed thereto a transverse bar 32. Below the latter there is a spacing nipple 33 and a rotatable crank member 34 which is operated by a knurled hand knob 35. A bolt 36 passes upward through these members and into the bar 22 to form a pivotal support. The crank member has a crank arm 38 to which there is pivoted at 39 the forward end of a link 40. The rear end of this link is pivoted at 41 to a pivot support 42 which is slidably carried by the bar 22. The support 42 has a spring catch 43 adapted to engage a notch 44 in the bar. The purpose of this connection will be explained later.

The transverse bar 32 carries a pair of slide holder bases 54. A piece of felt 55 or the like may be placed in each base to reduce friction as the bases are moved along the bar 32. Each base 54 carries an upright holder arm 51. Upon each arm is placed a split slide holder 45 by means of an apertured bearing 50 which fits over the arm 51 and is secured by a set screw 52. Normally the holder is pushed down on the arm 51 until it comes to rest upon a stop screw 56. However, if desired, the holder may be held in vertically adjusted position by the set screw 52. Each holder 45 has upper and lower bent over flanges 46 and 47 for positioning the slides 48 as is usual. The holder has an inner stop flange 57 which limits the inward position of the slide 48.

Each holder base 54 has pivoted thereto at 60 a link 61. The other ends of the links 61 are pivoted at 62, 62 upon the crank member 34. The central background card holder support 31 extends upwardly and is bent to form a lamp support 65 which receives an electric lamp 66 to illuminate the targets or slides. The instrument is also usually provided with a head rest 67, Fig. 1.

In using the improved split slide holder attachment disclosed herein, the user is supplied with whatever types or kinds of split slide pictures which are required in order to practise prescribed exercises. The split slides are placed in the slide holders 45, one set at a time. A background card, if any is required, is placed in the background holder 26. The background card prevents extraneous light from entering the patient's eyes. The card carries calibrations for subjective proof of fusion and measures of progress or other data relating to whatever test or training is to be carried on. Background cards and split slides are known and are therefore not specially illustrated.

The attachment provides the means for carrying out all the operations and movements of the split slides required for practising testing and training of binocular vision to the varied extents which optical science and experience have found necessary.

With the spring catch 43 in firm engagement with the notch 44 in the bar 22, clockwise rotation of the crank member 34 from the position shown in Fig. 2 will cause the split slide holder unit to move along the bar 22 forwardly, towards the viewer, and at the same time the split slides will automatically be moved closer together as the crank 38 during this forward movement is being rotated half a revolution in clockwise direction viewed from above, see Fig. 3. This operation therefore results in changes in accommodation due to the longitudinal movement and at the same time the convergence is changed orthophorically. By rotating the crank half a revolution counterclockwise the slide holder unit is brought back to the position shown in Fig. 2 with the slides furthest apart. Inasmuch as the pivot 41 is fixed, the longitudinal movement of the unit and the transverse movement of the slides occur automatically as a result of the manual rotation of the crank in that the hand of the operator instinctively and without concious effort follows the movements of the parts. The movements may be stopped, started, continued or reversed at any time by the operator intentionally manipulating the hand knob accordingly.

Although the spring catch engages the notch with sufficient frictional force to allow for practising orthophoric convergence, the spring may be disengaged at will by the operator exercising sufficient pulling or pushing force to cause such disengagement. Although not shown it will be understood that a set screw may be used instead of the spring and notch.

With the pivot 41 thus made movable along the bar 22 the entire unit may be moved lengthwise to effect changes in accommodation without changing the convergence, the operator merely holding the knob 35 firmly to prevent rotation thereof and of the crank as the unit is moved along the bar 22. Again, from any position along the bar, the operator may hold the unit against longitudinal movement while rotating the knob 35 thus practising changes in convergence without changes in accommodation. Finally, from any position on the bar 22 the unit may be moved longitudinally and the knob 35 rotated at the same time. This operation results in changes in accommodation with proportional change is convergence, not necessarily orthophoric.

Fig. 3 illustrates an extreme position of the unit in which the knob has been rotated to bring the split slides into their "in" position or closest together and at the same time the unit has been moved into far view position where it is stopped by a stop screw 70. The orthophoric change in convergence occurs automatically "from pivot to patient" as shown in Fig. 2. The movement of the split slides when they are moved closer to one another is limited by the links 61 striking the side of the crank member 34, Fig. 3. When the slides move away from each other the movement is limited by the link 40 abutting the side of the crank member 34, Fig. 2.

If the engagement between the spring catch and the bar is broken, manual rotation of the crank 38 will result in automatic transverse movement of the split sides without any longitudinal movement, provided the operator so desires, and resists the tendency of the unit to move along the bar. If the operator merely follows the movement of the bearing 23 as the crank is rotated, simultaneous lengthwise and transverse movements will result from the working together of the arm 34 and the link 40.

The mechanism disclosed therefore provides for moving the split slides orthophorically and lengthwise of the bar 22 whenever desired. It also provides for simultaneous proportional changes in accommodation and convergence, and for either of these movements without the other. The extent of the several movements are such as experience and science have shown to be necessary and sufficient for the training of binocular vision.

I claim:

1. A device of the character described comprising a support which extends along the viewing direction, a slide holder unit movably carried by the support, a pair of spaced pictures movably carried by said unit, mechanism in said unit connected to said pictures for automatically moving the pictures toward and away from each other simultaneous with lengthwise movement of the unit on said support and for moving the pictures toward and away from each other at will independent of any lengthwise movement of the unit and a rotatable knob connected to the unit for operating said mechanism to cause said automatic simultaneous movement of the pictures and for moving the pictures at will as aforesaid, said mechanism comprising a crank disk in said unit connected to said rotatable knob to be operated thereby and link members pivotally operatively connected to and between said crank disk and the said pictures.

2. In a device of the character described a longitudinal bar, means on said bar for securing the same to a standard stereoscopic instrument, a slide holder unit slidably supported on the bar and comprising a pair of spaced slide holders carrying a pair of slide pictures, the one picture being the stereoscopic complement of the other, said spaced slide holders being adapted to be moved away from and towards each other transversely of the said bar, a rotatable crank member in said unit, link connections between said member and said slide holders for moving the latter as aforesaid, a pivotal support slidably mounted on the said bar, means for securing said pivotal support in a predetermined fixed position on said bar, a link connection between the pivotal support and the said crank member and a manually operated knob for rotating the crank member to actuate all of the aforesaid link connections whereby to cause simultaneous transverse movement of the slide holders and lengthwise movement on the said bar of the said slide holder unit.

3. A device of the character described comprising a support which extends along the viewing direction, a picture holder unit slidably mounted on said support, a pair of spaced pictures movably carried by said unit, link connections supported in said unit and pivotally connected to the pictures to move the same automatically towards and away from each other as the said unit is moved lengthwise on said support, a rotatable member in said unit connected to said links for operating the same, a pivot member slidably mounted upon the support, a bar pivotally connected to and between said pivot member and said rotatable member in the unit for regulating the lengthwise movement of the unit and a rotatable hand knob carried by the unit for operating the same and actuating the said link connections.

HARRY S. ALEXANDER.

REFERENCES CITED

The following references are of record in the file of this patent:

UNITED STATES PATENTS

| Number | Name | Date |
|---|---|---|
| 2,362,857 | Renshaw | Nov. 14, 1944 |
| 1,948,901 | Brombach | Feb. 27, 1934 |
| 2,160,359 | Harper | May 30, 1939 |